United States Patent [19]

Mallon et al.

[11] 4,359,498
[45] Nov. 16, 1982

[54] TRANSDUCER STRUCTURE EMPLOYING VERTICALLY WALLED DIAPHRAGMS WITH QUASI RECTANGULAR ACTIVE AREAS

[75] Inventors: Joseph R. Mallon, Franklin Lakes; Anthony D. Kurtz, Englewood, both of N.J.

[73] Assignee: Kulite Semiconductor Products, Inc., N.J.

[21] Appl. No.: 255,468

[22] Filed: Apr. 20, 1981

[51] Int. Cl.³ .................. B32B 3/00; G01L 9/06; G01L 1/22
[52] U.S. Cl. .................. 428/156; 73/727; 310/338; 338/2; 338/4
[58] Field of Search .......... 310/338; 338/2, 4, 5; 73/727, 776; 428/156

[56] References Cited

U.S. PATENT DOCUMENTS

| | | | |
|---|---|---|---|
| 3,251,222 | 5/1966 | Fenner | 338/2 |
| 3,417,361 | 12/1968 | Heller et al. | 338/4 |
| 3,654,579 | 4/1972 | Kurtz et al. | 338/2 |
| 3,739,315 | 6/1973 | Kurtz et al. | 338/4 |
| 3,748,571 | 7/1973 | Kurtz | 338/47 |
| 3,753,196 | 8/1973 | Kurtz et al. | 338/4 |
| 3,800,264 | 3/1974 | Kurtz et al. | 338/2 |
| 3,978,731 | 7/1976 | Reeder et al. | 310/338 |
| 4,204,185 | 5/1980 | Kurtz et al. | 338/4 |
| 4,216,404 | 8/1980 | Kurtz et al. | 310/338 |
| 4,236,137 | 11/1980 | Kurtz et al. | 338/4 |

*Primary Examiner*—William R. Dixon, Jr.
*Attorney, Agent, or Firm*—Arthur L. Plevy

[57] ABSTRACT

There is disclosed a rectangular diaphragm employing a quasi rectangular active area. The diaphragm as configured has an aspect ratio which is the length to width ratio of greater than 3:1. The active area of the diaphragm, which is the area which most readily deflects upon application of a force to the diaphragm, is formed by an anisotropic etching technique to provide steep vertical sidewalls. The diaphragm structure thus described exhibits as a response to an applied force or pressure, a maximum longitudinal stress and a minimum transverse stress and can accommodate piezoresistive elements located within the active area of the diaphragm.

6 Claims, 3 Drawing Figures

TRANSDUCER STRUCTURE EMPLOYING VERTICALLY WALLED DIAPHRAGMS WITH QUASI RECTANGULAR ACTIVE AREAS

BACKGROUND OF INVENTION

This invention relates to transducer structures and more particularly to a transducer structure employing a relatively rectangular diaphragm having a relatively rectangular active area.

The prior art is replete with a number of transducer configurations. In general, such transducers consist of a bridge arrangement of piezoresistors mounted or integrally formed on a diaphragm. The diaphragm in many structures is fabricated from a thin wafer of silicon and possesses an active area which is conventionally manifested by an aperture in the diaphragm over which the piezoresistive elements are mounted. In this manner, a force applied to the diaphragm causes a deflection of the same; which deflection is attendant with a change in stress on the diaphragm and a consequent change in resistance of the piezoresistive elements which change is indicative of the magnitude of the pressure or force applied to the diaphragm.

Most diaphragms depicted in the prior art are circular in configuration. For examples of transducers employing circular diaphragms, reference is made to U.S. Pat. No. 3,654,579 entitled ELECTROMECHANICAL TRANSDUCERS AND HOUSINGS issued on Apr. 4, 1972 to A. D. Kurtz, et al. and assigned to the assignee herein. Other patents such as U.S. Pat. Nos. 3,748,571, 3,753,196, 3,800,264, 3,739,315 and various other patents too numerous to mention also depict the use of circular diaphragms in conjunction with transducer structures containing various arrangements of piezoresistive devices.

The prior art was also cognizant of the use of other geometric shapes for diaphragms incorporated in transducer structures. As such, certain prior art patents depict rectangular diaphragms employing various grooves and other structures to obtain maximum sensitivity during the force responsive mode. A particular type of diaphragm is depicted in U.S. Pat. No. 4,236,137 entitled SEMICONDUCTOR TRANSDUCERS EMPLOYING FLEXURE FRAMES issued on Nov. 25, 1980 to A. D. Kurtz, et al. and assigned to the Assignee herein. In such a diaphragm structure, a groove frames a central area of the diaphragm with the groove operating as a stress concentrating area to enable sensors mounted and positioned about the groove to provide relatively large output forces upon application of a stress to the diaphragm.

In general, a square or a circular diaphragm is symmetrical about the center point of the diaphragm. The aspect ratio, which is the ratio of the length of the diaphragm to the width of the diaphragm, is 1:1. In such diaphragms, the radial stress is of substantial mangitude and of opposite sign at the center of the diaphragm and at the edge of the diaphragm. In a rectangle, the length to width ratio is greater than 1:1 and for length to width ratios which are greater than 3:1, the ratio of longitudinal to transverse stress approaches theoretical minimum. For the purposes of this invention the longitudinal stress is defined as the stress parallel to the short axis of the diaphragm. In order to utilize a rectangular diaphragm in the most optimum manner, one would desire to take advantage of the maximum longitudinal piezoresistive effect and further, one would desire to substantially reduce or eliminate all transverse stress effects. This is because, for instance in P type silicon the maximum longitudinal coefficient which is in the $<111>$ crystallographic direction is accompanied by a transverse piezoresistive coefficient of $\frac{1}{2}$ the magnitude of the longitudinal piezoresistive coefficient and of opposite sign. Thus if such a gage is placed in the center of a circular diaphragm or a square diaphragm a substantial loss in sensitivity occurs. For a rectangular diaphragm however, maximum sensitivity is maintained since there is little transverse stress.

As one can ascertain from the above noted patent literature, the active area of a diaphragm is normally formed by a suitable semiconductor processing technique such as etching an aperture in the diaphragm to define an active area. According to prior art teachings, one incorporates and uses isotropic etching. An isotropic etch is an etchant which etches silicon in all the crystallographic directions at the same rate. The etching materials consist of a mixture of certain acids such as hydroflouric, nitric and acetic acid (HF, $HNO_3$, $CH_3OOH$).

As one can ascertain, by the use of isotropic etching, one forms an active area which possesses sloping sidewalls. This particular configuration can be shown in U.S. Pat. No. 4,204,185 entitled INTEGRAL TRANSDUCER ASSEMBLIES EMPLOYING THIN HOMOGENOUS DIAPHRAGMS issued on May 20, 1980 to A. D. Kurtz, et al. as well as others of the above cited patents. This shape of the sidewalls of the active area is not ideal, one does not provide the most effective edge clamping and furthermore, one does not utilize the material to its optimum degree. The sloping sidewalls serve to reduce the effective active area of the diaphragm and hence, result in material loss, while reducing the effectiveness of the edge clamping and resulting in insufficient area for bonding of the rim or disphragm support.

It is therefore an object of the present invention to provide an approximately rectangular diaphragm having a rectangular aperture with essentially vertical sidewalls defining an active area. It is a further object to provide such a diaphragm having a longitudinal stress, while exhibiting a transverse stress.

BRIEF DESCRIPTION OF THE PREFERRED EMBODIMENT

A diaphragm for a pressure transducer comprising a rectangular planar semiconductor member having a predetermined crystallographic orientation, having located on a major surface thereof a relatively rectangular cavity defining an active diaphragm area with said rectangular aperture characterized in having steep sloped vertical walls.

DETAILED DESCRIPTION OF THE INVENTION

In a semiconductor diaphragm with P type silicon sensors, the maximum longitudinal piezoresistive coefficient is defined as $\pi_L$ and is $+\frac{2}{3}\pi_{44}$. Such a piezoresistive element will have a transverse piezoresistive coefficient of $-\frac{1}{2}\pi_{44}$ maximum sensitivity in a diaphragm structure, one desirably should eliminate the transverse stress within the active area.

Figure 1:
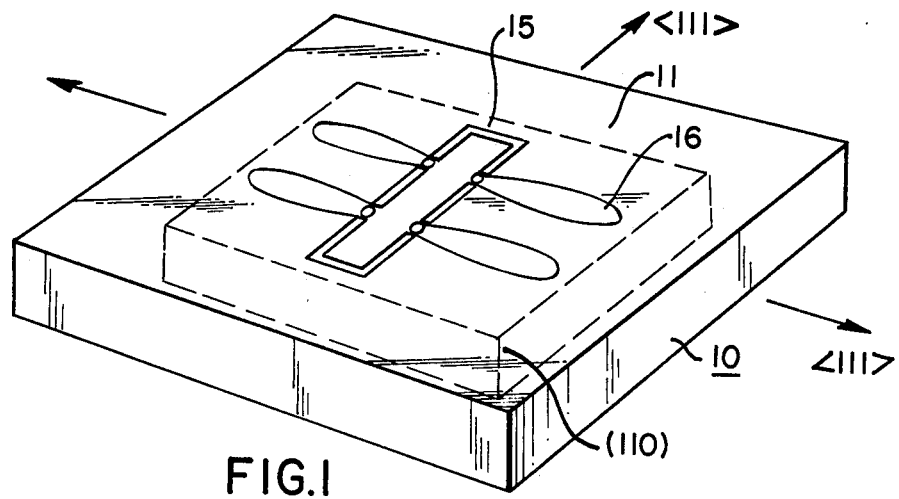
FIG. 1 is a perspective top plan view of a rectangular diaphragm according to this invention.

Referring to FIG. 1, there is shown a rectangular semiconductor wafer 10. The wafer 10 is formed from single crystal silicon having a (110) crystallographic plane. High quality silicon wafers of (110) orientation are readily available in a wide range of thicknesses, surface finishes and conductivity. In such wafers, the orientation is accurately aligned in the (110) orientation within + or −1% of the crystal axis. The wafer 10 has a length to width ratio of greater than 2:1. In this manner, one is assured that the transverse stress approaches its theoretical minimum and the ratio of longitudinal stress to transverse stress is approximately equal to one over Poisson's ratio. This ratio for silicon is approximately 0.3. A recess or aperture 11 (dashed) of a rectangular configuration is shown formed in the surface of the wafer 10. The recess is produced by an anisotropic etching technique to a desired depth. Anisotropic etching of single crystal silicon varies with the crystallographic orientation of the substrate and essentially is an etch whose rate depends upon the orientation of the crystal and is only effective for etching crystals of special orientation.

As indicated, the etch rate in an anisotropic etching varies with the crystallographic orientation of the wafer and decreases in the following order: (100)>(110)>(111). In order to achieve the anisotropic etch, etchants such as pyrocatechol ($C_6H_4(OH)_2$, (P), ethylene diamine ($NH_2)CH_2)_2NH_2$(ED) and water or others known in the art are used.

The use of such etchants to provide anisotropic etches are well known in the art and for example, see an article entitled "Anisotropic Etching of Silicon" by K. E. Bean published in the IEEE Transactions on Electron Devices, October 1978, Vol. ED-25, No. 1 on page 1185. A piezoresistive array 15 consisting of four sensors is deposited on the top surface of the wafer 10. The deposition of the array is well-known as well as the deposition of the terminals 16. The above noted patents shows typical examples.

Figure 2A:
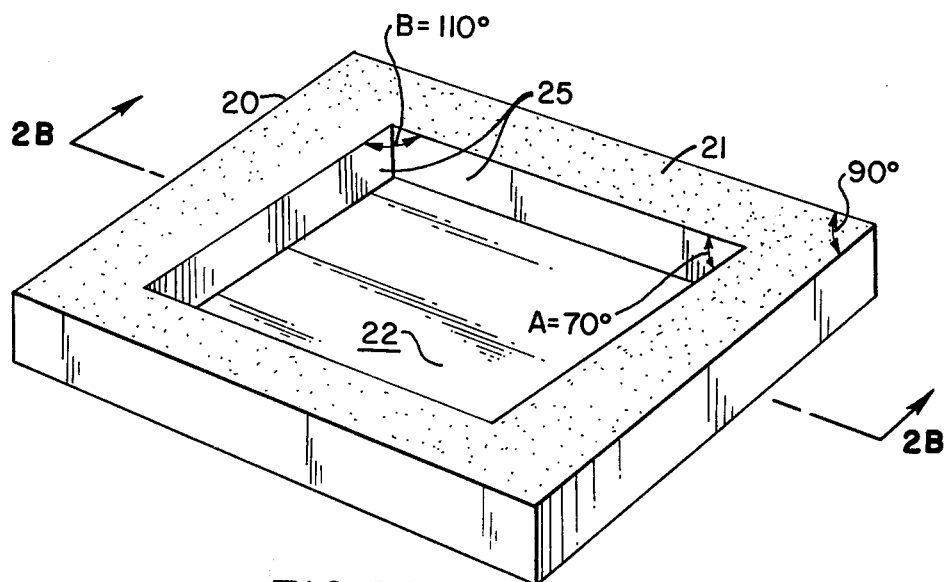
FIG. 2A is a perspective bottom plan view.
Figure 2B:
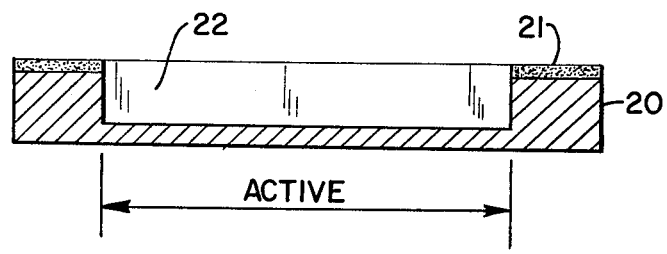
FIG. 2B is a side elevational view depicting a method for fabricating the diaphragm structure.

Referring to FIGS. 2A and 2B, there is shown a wafer 20 of a single crystal silicon of (110) orientation. A thin layer 21 of silicon dioxide or silicon nitride is grown on the top surface of wafer 20. The growth of silicon dioxide or silicon nitride is well known in the art and described in many references. After growth of the layer, one utilizes a rectangular mask definitive of the aperture 22, which mask is impressed upon the layer 21 by a photolithographic technique. The active area is then etched using the above described etchant solution.

Since the aperture is approximately rectangular with edges aligned to the <111> directions in configuration, it exhibits crystal planes in the vertical and horizontal directions as shown in FIG. 2A by arrows 25 at <111> planes. In employing a crystal orientation of (110), the etching stops and does not penetrate at the <111> planes. In this manner, one provides, as shown in FIG. 2A, an aperture 22 having relatively vertical sidewalls.

Due to the crystalline orientation as shown in FIG. 2C, the aperture 22 has extremely steep sidewalls, but essentially possesses the geometrical configuration of a parallelogram. The angle A is about 70° and hence is an acute angle, while the angle B is approximately 110° and hence is an obtuse angle. The depth of penetration of the etch is, of course, a function of the etch rate and strength of the etchant material. In this manner, a uniform and controlled etching rate can be obtained in utilizing etchants of various compositions. A particularly effective composition employs 4 mol percentage of pyrocatechol, 46.4 mol percentage of ethylene diamine and 49.4 mol percentage of water. The solution is employed at its boiling point (118° C.) in a nonoxidizing atmosphere. In using such a solution, the etch rate of the silicon is approximately fifty micrometers per hour. This relatively low etch rate is a distinct advantage in that one can control the depth of the aperture 22 to an extremely precise value.

As indicated, the formation of the above described diaphragm structure results in a rectangular assembly which exhibits a maximum longitudinal coefficient and hence, is extremely responsive to longitudinal stresses. The sensors can be deposited in a bridge array on the top or bottom surface of the diaphragm and within the active area defined by the boundaries of the rectangular aperture 22. Piezoresistive sensors can be implemented in the diaphragm by many well known techniques such as diffusion, epitaxial growth, bonding by means of glass or epoxy bonds and so on. Techniques for forming piezoresistive strain elements on silicon substrates are well known in the art and many examples of suitable methods clearly explained in the above noted patents.

By utilizing the diaphragm depicted in FIGS. 1 and 2 one virtually eliminates transverse stresses. Furthermore, the technique allows one to utilize relatively thick wafer members which can be etched very deeply to form deep apertures and hence, thin diaphragm assemblies. These structures allow relatively rugged transducer assemblies to be provided. Due to the vertical nature of the sidewalls of the aperture forming the active area, one is assured of an optimumly responsive diaphragm and the elimination of the sloping sidewalls further enhance the longitudinal responsiveness of the structure.

We claim:

1. A diaphragm for a pressure transducer for use with piezoresistors comprising:

a rectangular planar monocrystalline semiconductor member having a predetermined crystallographic orientation of (110), having located on a major surface thereof a cavity of a parallelogram configuration defining an active diaphragm area with said cavity characterized in having steep sloped vertical walls formed by an anisotropic etching with the said walls aligned to the <111> plane of said monocrystalline semiconductor member, whereby said diaphragm exhibits a maximum response in only the longitudinal stress mode suitable for the use of piezoresistive elements operating in the longitudinal peizoresistive mode.

2. The diaphragm according to claim 1 wherein said cavity has an aspect ratio (ratio of length to width) of greater than two to one.

3. The diaphragm according to claim 1 further comprising:

at least one piezoresistor located on said planar member on the surface thereof above said cavity.

4. The diaphragm according to claim 1 wherein said parallelogram cavity has one acute and one obtuse base angle.

5. The diaphragm according to claim 4 wherein said actue angle is about 70°, and said obtuse angle about 110°.

6. The diaphragm according to claim 1 wherein said planar member has an aspect ratio (ratio of length to width) of greater than three to one.

* * * * *